(12) United States Patent
Lenneman et al.

(10) Patent No.: US 8,358,207 B2
(45) Date of Patent: Jan. 22, 2013

(54) SYSTEM FOR PRE-ATTENTIVELY COMMUNICATING INFORMATION TO A DRIVER OF A VEHICLE

(75) Inventors: John K. Lenneman, Okemos, MI (US); Joseph F. Szczerba, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 334 days.

(21) Appl. No.: 12/475,093

(22) Filed: May 29, 2009

(65) Prior Publication Data

US 2010/0302020 A1    Dec. 2, 2010

(51) Int. Cl.
*B60Q 1/22* (2006.01)

(52) U.S. Cl. ............ 340/463; 340/425.5; 340/426.22; 340/441; 340/467

(58) Field of Classification Search ........... 340/441, 340/438, 461, 463, 472, 478, 815.45; 345/7
See application file for complete search history.

(56) References Cited

U.S. PATENT DOCUMENTS

| | | | |
|---|---|---|---|
| 3,320,586 A * | 5/1967 | Wagner | 340/464 |
| 3,521,232 A * | 7/1970 | Black | 340/441 |
| 3,550,076 A * | 12/1970 | Cornelius | 340/466 |
| 3,691,525 A * | 9/1972 | McClellan et al. | 340/466 |
| 3,694,084 A * | 9/1972 | Citron | 356/25 |
| 4,229,727 A * | 10/1980 | Gilhooley | 340/905 |
| 4,251,769 A * | 2/1981 | Ewert et al. | 324/96 |
| 4,323,895 A * | 4/1982 | Coste | 345/82 |
| 4,556,862 A * | 12/1985 | Meinershagen | 340/478 |
| 4,865,719 A * | 9/1989 | Moser et al. | 208/139 |
| 5,321,415 A * | 6/1994 | Mount | 345/7 |
| 5,323,321 A * | 6/1994 | Smith, Jr. | 701/428 |
| 5,374,917 A * | 12/1994 | Hoffman et al. | 340/438 |
| 5,469,184 A * | 11/1995 | Mount | 345/7 |
| 6,133,852 A * | 10/2000 | Tonkin | 340/903 |
| 6,175,305 B1 * | 1/2001 | Johnson et al. | 340/479 |
| 6,268,792 B1 * | 7/2001 | Newton | 340/467 |
| 6,870,474 B1 * | 3/2005 | Brothers | 340/468 |
| 6,914,521 B2 * | 7/2005 | Rothkop | 340/425.5 |
| 7,075,423 B2 * | 7/2006 | Currie | 340/467 |
| 7,155,329 B2 * | 12/2006 | Mepham et al. | 701/70 |
| 7,589,643 B2 * | 9/2009 | Dagci et al. | 340/905 |
| 7,598,849 B2 * | 10/2009 | Gallant et al. | 340/441 |
| 7,791,465 B1 * | 9/2010 | El-Massry | 340/478 |
| 7,865,304 B2 * | 1/2011 | Gretton et al. | 701/418 |

\* cited by examiner

*Primary Examiner* — Daniel Wu
*Assistant Examiner* — Son M Tang
(74) *Attorney, Agent, or Firm* — Ingrassia Fisher & Lorenz, P.C.

(57) ABSTRACT

Methods and systems are provided for pre-attentively communicating information to a driver of a vehicle. The system includes, but is not limited to a vehicle having a passenger compartment and an illumination component mounted within the passenger compartment. The illumination component is positioned to be peripherally visible to the driver as the driver looks in the direction of vehicle travel. An electronic processing device is operatively connected to the illumination component and is configured to control illumination of the illumination component in a manner that corresponds to a condition of the vehicle.

19 Claims, 4 Drawing Sheets

SYSTEM FOR PRE-ATTENTIVELY COMMUNICATING INFORMATION TO A DRIVER OF A VEHICLE

TECHNICAL FIELD

The technical field generally relates to communicating information to a driver, and more particularly relates to the use of illumination within a driver's peripheral vision to communicate information to the driver.

BACKGROUND

Drivers of vehicles frequently rely on on-board gauges to assess various operating conditions of their vehicles. For example, a driver may direct his gaze toward the vehicle's speedometer in order to determine the speed of the vehicle. This may cause the driver to momentarily divert his attention away from the road ahead of the vehicle and to redirect his or her attention towards the speedometer. The diversion of attention is undesirable.

Accordingly, it is desirable to communicate information to a driver of a vehicle regarding a condition of the vehicle, such as its speed, without requiring the driver to divert attention away from the road ahead. In addition, it is desirable to communicate such information visually. Furthermore, other desirable features and characteristics will become apparent from the subsequent detailed description and the appended claims, taken in conjunction with the accompanying drawings and the foregoing technical field and background.

SUMMARY

A system and method are provided for pre-attentively communicating information to a driver of a vehicle. In a first non-limiting embodiment, the system includes an illumination component mounted within a passenger compartment of a vehicle and positioned to be peripherally visible to the driver as the driver looks in the direction of vehicle travel. An electronic processing device is operatively connected to the illumination component and is designed, constructed and programmed to control illumination of the illumination component in a manner that corresponds to a condition of the vehicle.

In a second, non-limiting embodiment, the system includes, but is not limited to, a vehicle having a passenger compartment that includes an A-pillar, a B-pillar, and a door panel disposed between the A-pillar and the B-pillar. A light assembly having multiple light emitting diodes is mounted on the door panel and is positioned to be peripherally visible to the driver as the driver looks in the direction of vehicle travel. An electronic processing device is operatively connected to the illumination component and is designed, constructed and programmed to control illumination of the light assembly such that the light emitting diodes form light segments that appear to move from the A-pillar to the B-pillar at a rate that corresponds with a speed of the vehicle.

In a third, non-limiting embodiment, a method for pre-attentively communicating information to a driver of a vehicle is disclosed. The method includes, but is not limited to the steps of detecting a condition of the vehicle, communicating the condition of the vehicle to an electronic processing device mounted on the vehicle, and using the electronic processing device to control an illumination component mounted within the peripheral vision of the driver in a manner that corresponds to the condition.

DESCRIPTION OF THE DRAWINGS

One or more embodiments will hereinafter be described in conjunction with the following drawing figures, wherein like numerals denote like elements.

DETAILED DESCRIPTION

Figure 1:
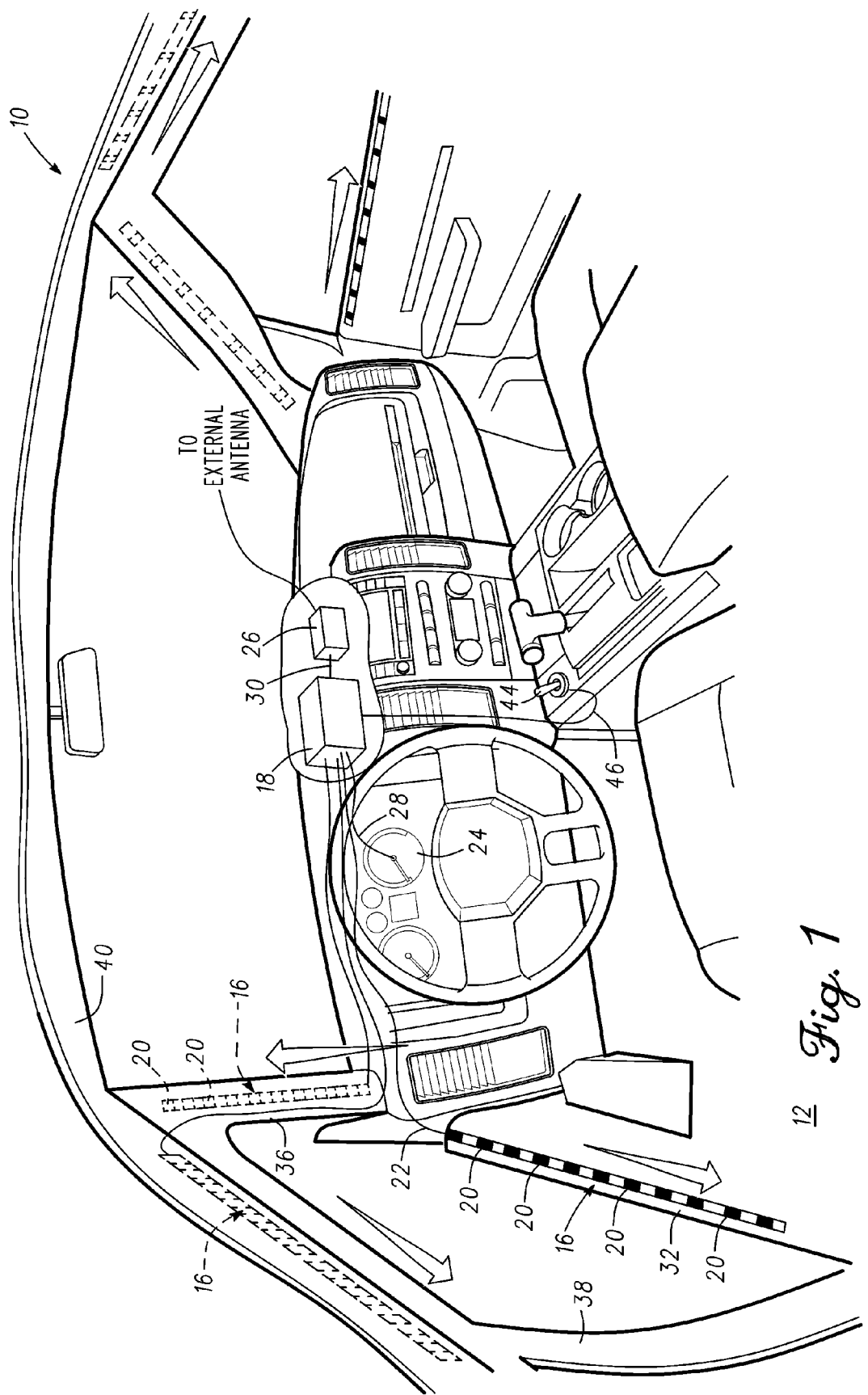
FIG. 1 is a cut-away schematic view illustrating a passenger compartment of a vehicle equipped with a non-limiting embodiment of a system for pre-attentively communicating information to a driver regarding a condition of the vehicle.

The following detailed description is merely exemplary in nature and is not intended to limit application and uses. Furthermore, there is no intention to be bound by any expressed or implied theory presented in the preceding technical field, background, brief summary or the following detailed description.

As used herein, the term "pre-attentive communication" refers to a person's ability to perceive communications and/or receive information without the need to divert his or her attention away from an activity that he or she is engaged in.

Various non-limiting embodiments of a system for pre-attentively communicating information to a driver of a vehicle regarding a condition of the vehicle are disclosed herein. In at least one embodiment, the system includes, but is not limited to, mounting an illumination component, such as a light assembly, in the interior of a vehicle in a position that falls within the range of the driver's peripheral vision. An electronic processing device, such as a computer, is operatively connected to the illumination component. The electronic processing device is also connected to a vehicle gage, such as a speedometer, from which the electronic processing device may determine a condition of the vehicle. The electronic processing device may additionally or alternatively be connected to other types of gages, probes, components and/or sensors mounted in the vehicle such as a telematics unit that is designed, constructed and programmed to receive GPS data and to permit communications with a remote call center. The telematics unit may provide information to the electronic processing device that is relevant to a condition of the vehicle, such as a speed limit associated with the road the vehicle is traveling on.

The electronic processing device can control the light assembly to illuminate in a manner that conveys information to the driver regarding a condition of the vehicle or a circumstance of vehicle operation. For example, the electronic processing device can cause individual light elements on the light assembly to alternatively illuminate and extinguish in a pattern that creates the appearance of movement. In one embodiment, the electronic processing device may create the appearance of a series of illuminated segments moving along the light assembly. Using his peripheral vision, the driver can perceive the movement without redirecting his gaze from the road ahead.

The movement of light segments and/or their size can be correlated with a condition of the vehicle. For instance, if the vehicle is traveling at 35 miles per hour, the electronic processing device may cause the light assembly to display light segments that are elongated rectangles and that move across the light assembly at a relatively slow rate. If the vehicle is traveling at 65 miles per hour, the electronic processing device may cause the light assembly to display light segments that are thin vertical lines and that move across the light assembly at a relatively fast rate. In other embodiments, the rate of the light segments may vary with speed but their widths may remain constant. In still other embodiments, the width of the light segment may vary, but their rate of movement across the light assembly may remain constant.

The apparent movement of the light segments along the light assembly is detected by the driver using his peripheral vision. By varying the dimensions and the rates of movement of the light segments, the driver is able to gain an understanding of how slowly or quickly his vehicle is traveling without needing to focus on the light assembly and without needing to redirect his gaze from the road ahead to his speedometer.

In embodiments of the system where the electronic processing device is connected both the speedometer and to the telematics unit (or to some other component configured to communicate with systems external to the vehicle), and can, therefore, compare the vehicle speed with a local speed limit, the rate of movement across the light assembly and/or the width of the light segment may correspond to the vehicle's speed relative to the speed limit. For example, if the vehicle is traveling at 35 miles per hour on a road with a speed limit of 25 miles per hour, the electronic processing unit may cause the light assembly to display thin light segments moving rapidly across the light assembly. If the vehicle is traveling at 65 miles per hour on a freeway where the speed limit is 70 miles per hour, the electronic processing device may cause the light assembly to display elongated rectangular segments moving slowly across the light assembly.

A greater understanding of the disclosed systems for pre-attentively communicating information to a driver may be obtained through a review of the accompanying illustrations and a review of the related detailed description that follows.

Figure 2:
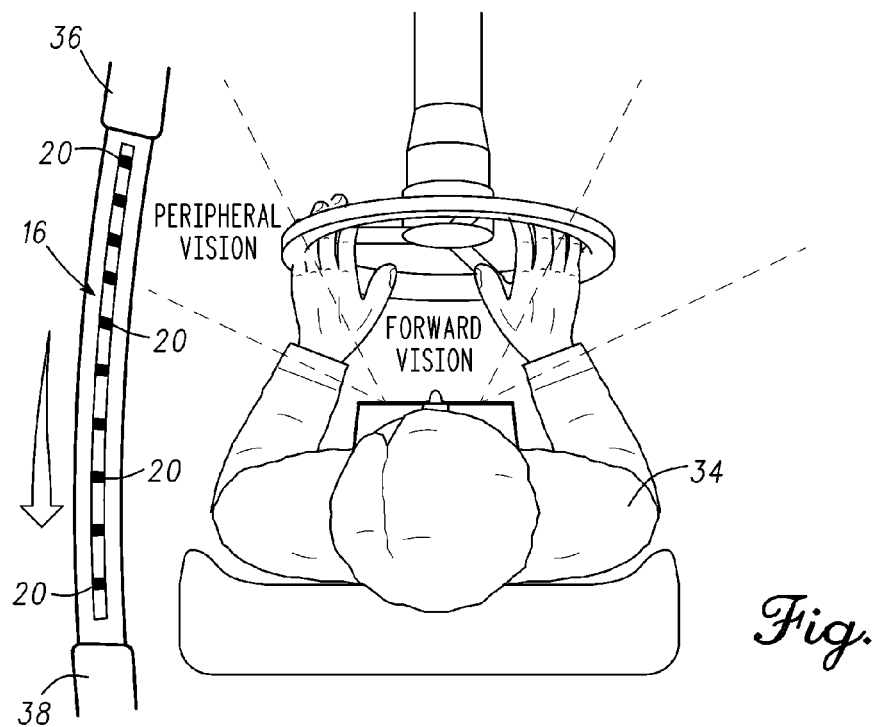
FIG. 2 is a plan view illustrating operation of the system of FIG. 1 for pre-attentively communicating information to a driver.

With respect to FIGS. 1 and 2, an embodiment of the system for pre-attentively communicating information to a driver is illustrated. In FIG. 1, a cut-away schematic view is presented illustrating a vehicle 10 having a passenger compartment 12 equipped with a non-limiting embodiment of a system for pre-attentively communicating information to a driver. Although vehicle 10 is depicted as an automobile, it should be understood that embodiments of the present system may be employed in all manner of vehicles including, but not limited to, trucks, buses, trains, aircraft, watercraft and spacecraft.

The system for pre-attentive communication includes a lighting component and an electronic processing device. In the illustrated embodiment, the lighting component is light assembly 16. Light assembly 16 includes an elongated, narrow substrate supporting multiple lighting elements arranged along a length of the substrate and which are covered by a translucent or transparent shroud. In other embodiments, the substrate may have any suitable shape. In still other embodiments, multiple independent substrates, each supporting one or more lighting elements, may be arranged proximate one another in any suitable pattern. The lighting elements may include any type of light source including, but not limited to, fluorescent bulbs, incandescent bulbs, halogen bulbs, lasers, light pipes, fiber optic elements, and light emitting diodes (LEDs).

The brightness and intensity of light output from the lighting elements may be controlled to ensure a desired level of illumination. For example, in some embodiments, it may be desirable to ensure that the lighting elements generate only a dim, subtle illumination to avoid distracting a driver. In other embodiments, it may be desirable to control and/or vary the brightness and/or intensity of the illumination as a means of pre-attentively communicating information to the driver. The light output may be tuned in various ways including controlling the power supplied to the lighting elements and by selecting a shroud that permits a desired amount of translucence.

The multiple lighting elements are capable of independent illumination and, as discussed below, may be controlled to turn on and off in patterns that create the appearance that illuminated segments of light 20 are moving across light assembly 16. The patterns may be controlled to correlate to the information that is being pre-attentively communicated to the driver. For example, rapid movement of illuminated segments of light 20 may make the driver aware that he is driving at a high rate of speed or that he is exceeding the speed limit.

In the illustrated embodiment, the electronic processing device is a microprocessor 18. In other embodiments, the electronic processing device may be any suitable processor or computer. Microprocessor 18 is operatively connected to light assembly 16 through lead or bus 22. Although microprocessor 18 is depicted as an independent component, it should be understood that in other embodiments, microprocessor 18 may be incorporated into light assembly 16.

Microprocessor 18 is programmed to control the illumination of the individual lighting elements of light assembly 16 in any manner suitable for pre-attentively communicating information to the driver. Microprocessor 18 is further programmed to receive information and/or data from other vehicle systems and components such as speedometer 24 and telematics unit 26 across buses or leads 28 and 30, respectively. Speedometer 24 is configured to provide data relating to the speed of vehicle 10 and telematics unit 26 may be configured to provide data relating to local speed limits, among other things. In other embodiments, other components and/or systems may be available and in communication with microprocessor 18 to provide this data. When microprocessor 18 has the speed and/or speed limit information, it controls the individual lighting components of light assembly 16 to pre-attentively communicate this information to the driver.

As illustrated in FIG. 2, light assembly 16 is positioned along an upper portion of door panel 32 in a location that falls within the peripheral vision of driver 34. In this position, the driver can detect the movement of the illuminated segments of light 20. In the illustrated embodiment, illuminated segments of light 20 move from A-pillar 36 towards B-pillar 38. In other embodiments, illuminated segments of light 20 may move in the opposite direction. In differently configured illumination components, light or light segments may flash, radiate outwardly or inwardly in a circular or other geometric pattern, move upwardly or downwardly or in any other direction and/or pattern effective to pre-attentively communicate information to the driver.

In some embodiments, light assembly 16 may be positioned in other locations within passenger compartment 12. As illustrated in FIG. 1, light assembly may be positioned on A-pillar 36 or may be embedded in headliner 40. In still other embodiments, light assembly 16 may be positioned in a vehicle seat, a steering wheel, a dash board, an instrument panel, an armrest, a window, a windshield, a rear view mirror, and any other position that falls within the peripheral vision of the driver.

Figure 3:
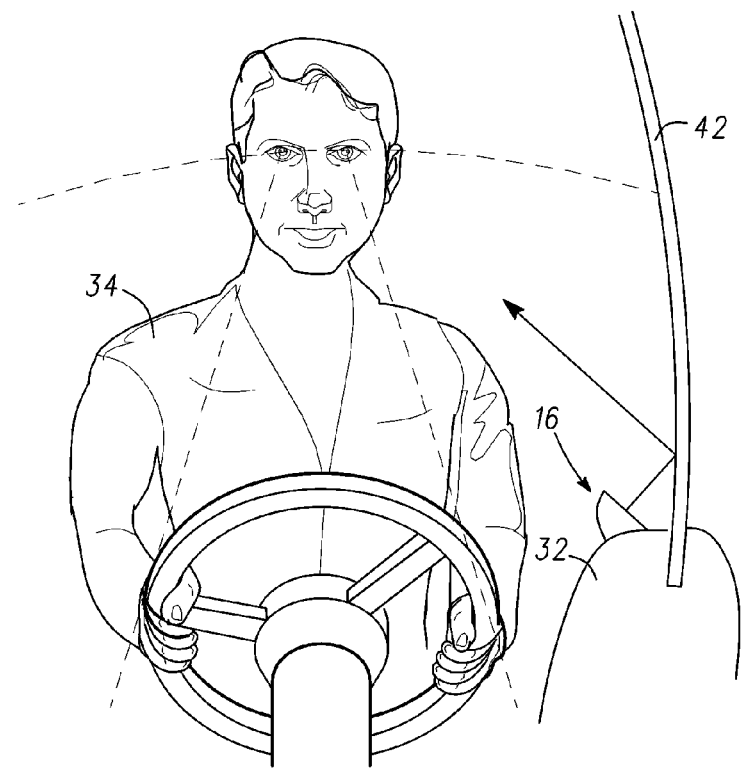
FIG. 3 is a schematic view illustrating an alternate embodiment of the system of FIG. 2 configured to direct light towards a reflective surface of the vehicle's interior.

In FIG. 3, light assembly 16 is mounted in door panel 32 so as to direct light away from driver 34 and towards window 42. In this configuration, illumination from light assembly 16 is reflected off of window 42 and into driver 34's field of peripheral vision. Arranging the light assembly 16 to reflect light in this manner may emulate the passing of terrain, which is normally visible in the peripheral vision of a driver. By emulating the passing of terrain, the projected light may be easily assimilated and understood by the driver.

A switch 44 (see FIG. 1) may be connected to microprocessor 18 via lead or bus 46 and may be configured to disable microprocessor 18 from illuminating any of the individual lighting elements of light assembly 16. This allows the driver to selectively employ the system at times of his choosing, and to disable the system altogether. In other embodiments, switch 44 may be connected to light assembly 16 to selectively disable and enable illumination of light assembly 16.

Figure 4:
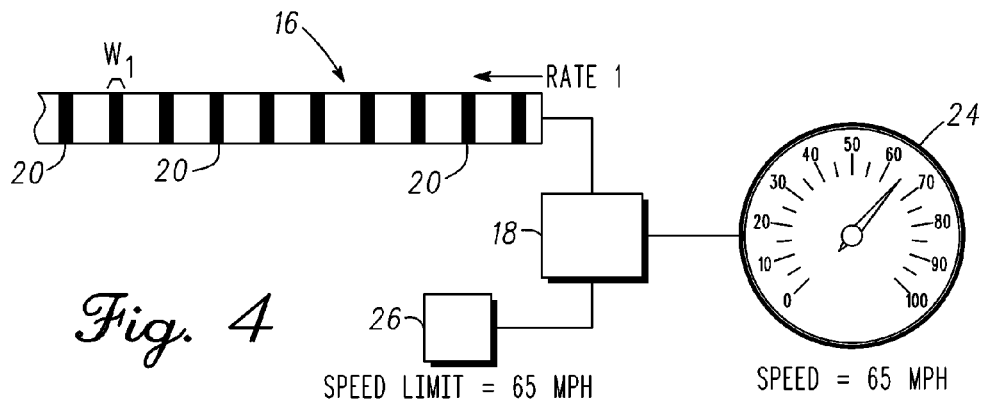
FIGS. 4-6 are schematic views illustrating operation of the system of FIG. 1 to communicate differing vehicle conditions to the driver.
Figure 5:
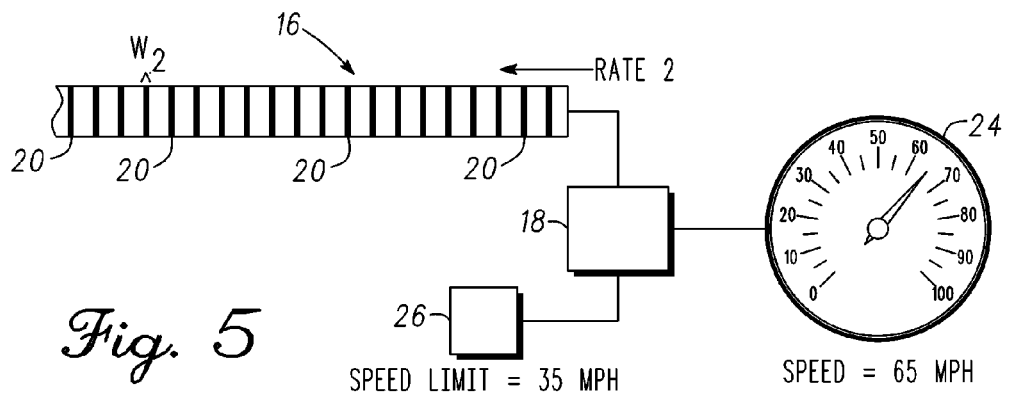
Figure 6:
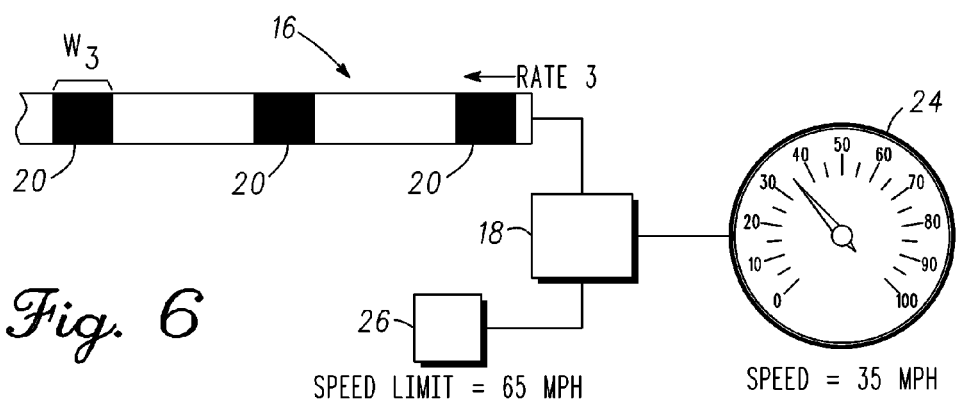

With respect to FIGS. 4-6, schematic views are presented of light assembly 16, microprocessor 18, speedometer 24 and telematics unit 26 during differing vehicle conditions to illustrate three non-limiting examples of system operation. In the first example, shown in FIG. 4, vehicle 10 (not shown) is traveling at 65 miles per hour on a road where the speed limit is 65 miles per hour. Speedometer 24 communicates the speed of vehicle 10 to microprocessor 18 while telematics unit 26 conveys the speed limit to microprocessor 18. Under these conditions, microprocessor 18 controls the light assembly 16 to display illuminated segments of light 20 moving across light assembly 16 at a first rate which is associated with the vehicle traveling at the speed limit. Additionally, each individual illuminated segment of light has a first width W1 that is also associated with the vehicle traveling at an appropriate speed.

In the second example, illustrated in FIG. 5, vehicle 10 (not shown) is traveling at 65 miles per hour on a road where the speed limit is 35 miles per hour. Speedometer 24 communicates the speed of vehicle 10 to microprocessor 18 while telematics unit 26 conveys the speed limit to microprocessor 18. Under these conditions, microprocessor 18 controls the light assembly 16 to display illuminated segments of light 20 moving across light assembly 16 at a second rate which is associated with the vehicle traveling at in excess of the speed limit. The second rate is faster than the first rate. The change in rate of the illuminated segments of light 20 will be perceived by the driver without having to take his eyes off of the road.

Furthermore, each individual illuminated segment of light has a second width W2 that is also associated with the vehicle traveling in excess of the speed limit. The second width is thinner than the first width and this difference in width may add to the driver's ability to perceive and pre-attentively assimilate the information.

The change from the first rate and the first width to the second rate and the second width may occur immediately upon exceeding the speed limit or may not occur until a predetermined threshold is reached. In some embodiments, the predetermined threshold may be set by the vehicle operator. In other embodiments, it may be set by the vehicle owner. In other embodiments, it may be set by the vehicle manufacturer.

In the third example, illustrated in FIG. 6, vehicle 10 (not shown) is traveling at 35 miles per hour on a road where the speed limit is 65 miles per hour. Speedometer 24 communicates the speed of vehicle 10 to microprocessor 18 while telematics unit 26 conveys the speed limit to microprocessor 18. Under these conditions, microprocessor 18 controls light assembly 16 to display illuminated segments of light 20 moving across light assembly 16 at a third rate which is associated with the vehicle traveling below the speed limit. The third rate is slower than the first rate. The change in rate of the illuminated segments of light 20 will be perceived by the driver without him having to take his eyes off of the road.

Furthermore, each individual illuminated segment of light has a third width W3 that is also associated with the vehicle traveling below the speed limit. The third width is wider than the first width and this difference in width may add to the driver's ability to perceive and pre-attentively assimilate the information.

The change from the first rate and the first width to the third rate and the third width may occur immediately upon falling below the speed limit or may not occur until a predetermined threshold is reached. In some embodiments, the predetermined threshold may be set by the vehicle operator. In other embodiments, it may be set by the vehicle owner. In other embodiments, it may be set by the vehicle manufacturer.

In other embodiments of the system, microprocessor 18 may be programmed to keep all of the individual lighting elements of light assembly 16 extinguished when vehicle 10 is traveling at approximately the speed limit and may illuminate light assembly 16 only when the vehicle's speed deviates from the speed limit. The sudden appearance of illumination when the vehicle is going too fast or too slow may help to make the inappropriate speed of the vehicle very apparent to the driver.

Figure 7:
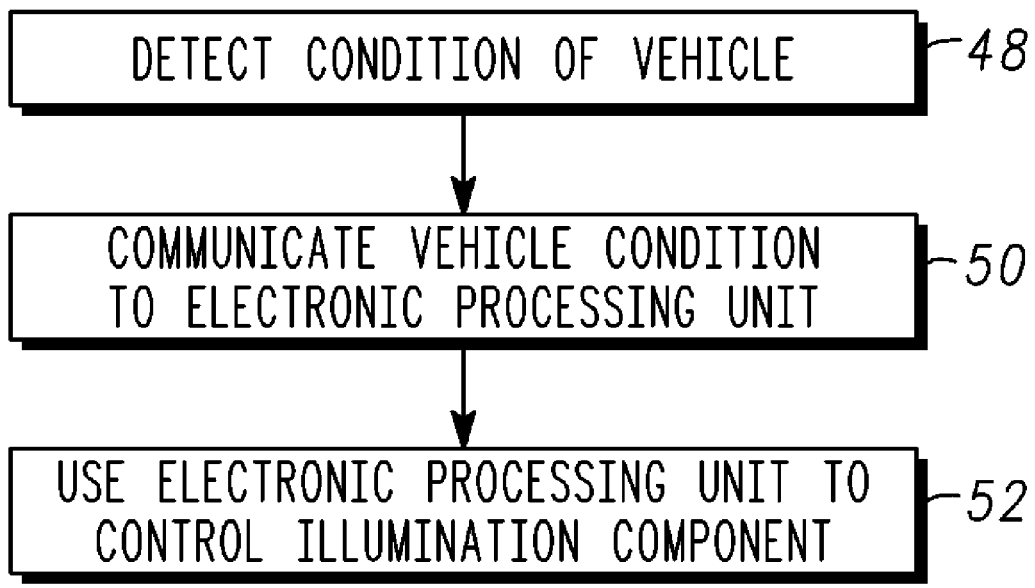
FIG. 7 is a flow chart illustrating a non-limiting embodiment of a method for pre-attentively communicating information to a driver regarding a condition of the vehicle.

With respect to FIG. 7, an exemplary method of using the system for pre-attentively communicating information to a driver is illustrated. According to the illustrated method, at block 48, a condition of the vehicle is detected. This can occur at speedometer 24 where the vehicle's speed is detected, at telematics unit 26 where the speed limit is detected, or at any other vehicle component or system that is configured to determine a condition of the vehicle. At block 50, the condition is communicated to microprocessor 18. At block 52, microprocessor controls light assembly 16 to illuminate combinations and series of individual lighting elements in a pattern and/or sequence that corresponds to the detected condition of the vehicle.

It should be understood by those of ordinary skill in the art that while the examples discussed in this disclosure have related primarily to pre-attentively communicating to the driver information regarding the speed of his vehicle, the principles and teachings contained herein are equally applicable to the communication of any vehicle condition. Furthermore, while at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system for pre-attentively communicating information to a driver of a vehicle, the system comprising:
an illumination component mounted within a passenger compartment of the vehicle and positioned to be peripherally visible to the driver as the driver looks in a direction of vehicle travel; and an electronic processing device operatively connected to the illumination component and configured to control the illumination component to display a plurality of light segments that appear to be continuously moving from one of the plurality of light segments to another light segment repeatedly, wherein movement of the plurality of light segments corresponds with a speed of the vehicle.

2. The system of claim 1 wherein the illumination component comprises a light assembly configured to display a plurality of light segments that appear to move from a front of the vehicle to a rear of the vehicle at a rate corresponding to the speed of the vehicle.

3. The system of claim 2 wherein the light assembly is configured to display a plurality of light segments that appear to move from the front of the vehicle to the rear of the vehicle at a first rate when the vehicle is traveling at approximately a posted speed limit.

4. The system of claim 3 wherein the light assembly is configured to display a plurality of light segments that appear to move from the front of the vehicle to the rear of the vehicle at a second rate that exceeds the first rate when the vehicle exceeds the posted speed limit by a predetermined amount.

5. The system of claim 3 wherein the light assembly is configured to display a plurality of light segments that appear to move from the front of the vehicle to the rear of the vehicle at a third rate that is less than the first rate when the vehicle's speed falls below the posted speed limit by a predetermined amount.

6. The system of claim 3 wherein the light assembly is configured to display a plurality of light segments that appear to move from the front of the vehicle to the rear of the vehicle at a second rate that exceeds the first rate when the vehicle exceeds the posted speed limit by a predetermined amount and wherein the light assembly is further configured to display a plurality of light segments that appear to move from the front of the vehicle to the rear of the vehicle at a third rate that is less than the first rate when the vehicle's speed falls below the posted speed limit by a predetermined amount.

7. The system of claim 1 wherein the illumination component is configured and positioned to direct light against a reflective surface in the passenger compartment and wherein light from the illumination component that reflects off of the reflective surface falls within a field of peripheral vision of the driver.

8. The system of claim 1 wherein the illumination component comprises a light assembly configured to display a plurality of light segments that appear to move from a front of the vehicle to a rear of the vehicle and wherein each light segment has a width dimension that corresponds with the speed of vehicle.

9. The system of claim 8 wherein each light segment has a first width dimension that corresponds to the condition wherein the vehicle is traveling at approximately a speed limit.

10. The system of claim 9 wherein each light segment has a second width dimension that corresponds to the condition wherein the vehicle exceeds the speed limit by at least a predetermined amount, the second width dimension being less than the first width dimension.

11. The system of claim 9 wherein each light segment has a third width dimension that corresponds to the condition wherein the vehicle speed falls below the speed limit by at least a predetermined amount, the third width dimension being greater than the first width dimension.

12. The system of claim 1 wherein the illumination component is mounted on a door panel.

13. The system of claim 1 wherein the illumination component is mounted on an A-pillar.

14. The system of claim 1 wherein the illumination component is mounted within a headliner.

15. The system of claim 1 wherein the illumination component comprises light emitting diodes.

16. The system of claim 1 wherein the electronic processing device is configured to communicate with an on-board vehicle system to determine the speed of the vehicle.

17. The system of claim 1 further comprising a switch operatively connected to the illumination component to selectively disable the illumination component.

18. A system for pre-attentively communicating information to a driver of a vehicle, the system comprising:
   a vehicle having a passenger compartment including an A-pillar, a B-pillar, and a door panel disposed between the A-pillar and the B-pillar;
   a light assembly comprising a plurality of light emitting diodes, the light assembly being mounted on the door panel and positioned to be peripherally visible to the driver as the driver looks in a direction of vehicle travel; and
   an electronic processing device operatively connected to the light assembly and configured to control illumination of the light assembly such that the light emitting diodes form a plurality of light segments that appear to continuously move from one of the plurality of light segments to another light segment repeatedly from the A-pillar to the B-pillar at a rate that corresponds with a speed of the vehicle.

19. A method for pre-attentively communicating information to a driver of a vehicle, the method comprising:
   detecting a condition of the vehicle;
   communicating the condition of the vehicle to an electronic processing device mounted on the vehicle;
   using the electronic processing device to control an illumination component mounted within a field of peripheral vision of the driver in a manner that causes a plurality of light segments to appear to move continuously from one of the plurality of light segments to another light segment repeatedly at a rate that corresponds to a speed of the vehicle.

* * * * *